United States Patent
Hapsari et al.

(10) Patent No.: US 8,830,901 B2
(45) Date of Patent: Sep. 9, 2014

(54) MOBILE COMMUNICATION SYSTEM

(75) Inventors: Wuri Andarmawanti Hapsari, Yokosuka (JP); Anil Umesh, Yokohama (JP); Hideaki Takahashi, Yokohama (JP); Mikio Iwamura, Tokyo (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 91 days.

(21) Appl. No.: 13/266,299

(22) PCT Filed: Apr. 21, 2010

(86) PCT No.: PCT/JP2010/057082
§ 371 (c)(1),
(2), (4) Date: Oct. 26, 2011

(87) PCT Pub. No.: WO2010/125954
PCT Pub. Date: Nov. 4, 2010

(65) Prior Publication Data
US 2012/0044859 A1    Feb. 23, 2012

(30) Foreign Application Priority Data
Apr. 27, 2009 (JP) ................. 2009-108558

(51) Int. Cl.
*H04J 3/08* (2006.01)
*H04W 36/00* (2009.01)

(52) U.S. Cl.
CPC ............... *H04W 36/0016* (2013.01)
USPC .......................... 370/315; 370/252

(58) Field of Classification Search
CPC ............................. H04W 36/0016
USPC ................................... 370/252, 315
See application file for complete search history.

(56) References Cited

U.S. PATENT DOCUMENTS

| | | |
|---|---|---|
| 2007/0086388 A1 | 4/2007 | Kang et al. |
| 2007/0105558 A1 | 5/2007 | Suh et al. |
| 2008/0090575 A1 | 4/2008 | Barak et al. |

(Continued)

FOREIGN PATENT DOCUMENTS

| | | |
|---|---|---|
| EP | 1775984 A2 | 4/2007 |
| EP | 2 018 074 A1 | 1/2009 |

(Continued)

OTHER PUBLICATIONS

International Search Report w/translation from PCT/JP2010/057028 dated Jun. 29, 2010 (4 pages).

(Continued)

*Primary Examiner* — Wanda Z Russell
(74) *Attorney, Agent, or Firm* — Osha Liang LLP

(57) ABSTRACT

A radio base station includes a mobile communication system, a relay node and a radio base station connected via a radio bearer. A mobile station is configured to conduct a handover process between the state in which a radio bearer is set with the relay node in order to communicate via the relay node and the radio base station, and the state in which a radio bearer is set with the radio base station in order to communicate via the radio base station. The mobile station is configured such that during the handover process, control signals involved in the handover process are sent and received via a radio bearer between the relay node and the radio base station.

1 Claim, 3 Drawing Sheets

(56) References Cited

U.S. PATENT DOCUMENTS

| 2008/0285501 | A1 | 11/2008 | Zhang et al. | |
|---|---|---|---|---|
| 2010/0195635 | A1 | 8/2010 | Maeda | |
| 2010/0272007 | A1* | 10/2010 | Shen et al. | 370/315 |
| 2011/0038276 | A1* | 2/2011 | Ninagawa | 370/252 |
| 2011/0286429 | A1* | 11/2011 | Vikberg et al. | 370/331 |
| 2012/0008776 | A1 | 1/2012 | Ishida et al. | |

FOREIGN PATENT DOCUMENTS

| JP | 2007-116696 A | 5/2007 |
|---|---|---|
| JP | 2009060156 A | 3/2009 |
| WO | 2008/084943 A1 | 7/2008 |
| WO | 2009/022610 A1 | 2/2009 |
| WO | 2009/043866 A2 | 4/2009 |
| WO | 2010/116621 A1 | 10/2010 |

OTHER PUBLICATIONS

3GPP TS 36.423 V10.3.0; "3rd Generation Partnership Project; Technical Specification Group Radio Access Network; Evolved Universal Terrestrial Radio Access Network (E-UTRAN); X2 application protocol (X2AP) (Release 10)"; Sep. 2011 (132 pages).
Written Opinion from PCT/JP2010/057082 dated May 29, 2010 (4 pages).
Office Action for Russian Application No. 2011144424/07 dated Jan. 16, 2013, with English translation thereof (8 pages).
Office Action for Mexican Patent Application No. MX/a/2011/011308 dated Aug. 15, 2012, with English translation thereof (4 pages).
Office Action for Japanese Patent Application No. 2009-108558 mailed Mar. 6, 2012, with English translation thereof (4 pages).
Office Action for Japanese Patent Application No. 2009-108558 mailed Oct. 11, 2011, with English translation thereof (6 pages).
Office Action corresponding Canadian Application No. 2,759,905 dated Mar. 4, 2013 (3 pages).
3GPP TS 36.423 V8.0.0; "3rd Generation Partnership Project; Technical Specification Group Radio Access Network; Evolved Universal Terrestrial Radio Access Network (EUTRAN); X2 application protocol (X2AP) (Release 8)"; Dec. 2007 (60 pages).
Extended European search report for European Application No. 10769653.6 dated May 3, 2013 (9 pages).
Office Action for Japanese Application No. 2011-270331 dated May 14, 2013, with English translation thereof (5 pages).
Office Action for Korean Application No. 10-2011-7026173 dated May 14, 2013, with English translation thereof (5 pages).
3GPP TSG-RAN WG3 #63bis, R3-090702; "Preference for Relay Operation in LTE-A"; Qualcomm Europea; Seoul, Korea, Mar. 23-27, 2009 (6 pages).
3GPP TSG RAN WG3 Meeting #63bis, R3-090890; "First Consideration on RAN3 issues for Relaying"; Nokia Siemens Networks, Nokia, Seoul, S. Korea, Mar. 23-27, 2009 (3 pages).
3GPP TS 36.300 V8.7.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) (Dec. 2008) (144 pages).
3GPP TS 36.300 V8.8.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2" (Relase 8) (Mar. 2009) (158 pages).
ETSI TS 136 423 V8.3.0; "LTE; Evolved Universal Terrestrial Radio Access Network (E-UTRAN); X2 Application Protocol (X2AP) (3GPP TS 36.423 version 8.3.0 Release 8)" (Nov. 2008) (86 pages).
Office Action in related Canadian application No. 2,759,905 dated Jul. 30, 2013 (3 pages).
Office Action dated Oct. 9, 2013 in related Chinese application No. 201080018580.7 (with English translation)(9 pages).
Extended European Search Report dated Dec. 13, 2013 in related European Application No. 13193055.4-1857 (8 pages).
Official Action in counterpart Canadian Patent Application No. 2,759,905 issued on Jan. 2, 2014 (4 pages).
Qualcomm Europe; "Preference for Relay Operation in LTE-A"; 3GPP TSG-RAN WG2 #65bis, R2-092153; Seoul, Korea, Mar. 23-27, 2009 (6 pages).

* cited by examiner

MOBILE COMMUNICATION SYSTEM

BACKGROUND OF INVENTION

1. Technical Field

The present invention relates to a mobile communication system.

2. Background Art

A mobile communication system of the LTE scheme (Release.8) defined by the 3GPP, as illustrated in FIG. 6, is configured such that when a handover process by a mobile station UE is carried out from a radio base station eNB#1 to a radio base station eNB#2, control signals involved in the handover process are sent and received between the radio base station eNB#1 and the radio base station eNB#2 via an X2 bearer that is set between the radio base station eNB#1 and the radio base station eNB#2.

As illustrated in FIG. 6, the radio base station eNB#1 and the radio base station eNB#2 include a network layer 1 (NW L1) function, a network layer 2 (NW L2) function, an IP (Internet Protocol) layer function, and an SCTP (Stream Control Transmission Protocol) layer function as the X2 bearer functions configured to establish the X2 bearer.

In an LTE-Advanced mobile communication system, which is the communication scheme that is the next-generation of the LTE scheme, "relay nodes RN" provided with the same functions as a radio base station eNB can establish a connection between a mobile station UE and the radio base station eNB.

However, the conventional mobile communication system has been problematic in that there is no regulation for how handover processes by the mobile station UE are to be handled when the relay nodes RN have been connected.

SUMMARY OF INVENTION

One or more embodiments of the present invention may provide a mobile communication system capable of implementing a handover process of a mobile station even when relay nodes have been connected.

The first feature of the present invention is summarized in that a mobile communication system, a relay node and a radio base station are connected via a radio bearer, a mobile station is configured to conduct a handover process between the state in which a radio bearer is set with the relay node in order to communicate via the relay node and the radio base station, and the state in which a radio bearer is set with the radio base station in order to communicate via the radio base station, and the mobile station is configured such that during the handover process, control signals involved in the handover process are sent and received via a radio bearer between the relay node and the radio base station.

The first feature of the present invention is summarized in that the relay node and the radio base station include a layer function configured to perform keep-alive processes for the radio bearer as an upper layer function of a function configured to set the radio bearer.

The first feature of the present invention is summarized in that the relay node and the radio base station comprise a first layer function configured to perform security processes between the relay node and the radio base station, as an upper layer function of a function configured to set the radio bearer and a second layer function configured to perform keep-alive processes for the radio bearer, as an upper layer function of the first layer function.

As has been described above, according to the present invention, it is possible to provide a mobile communication system capable of implementing a handover process of a mobile station even when relay nodes have been connected.

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention. A description will be provided for the mobile communication system according to an embodiment of the present invention, with reference to FIG. 1 to FIG. 5.

Figure 1:
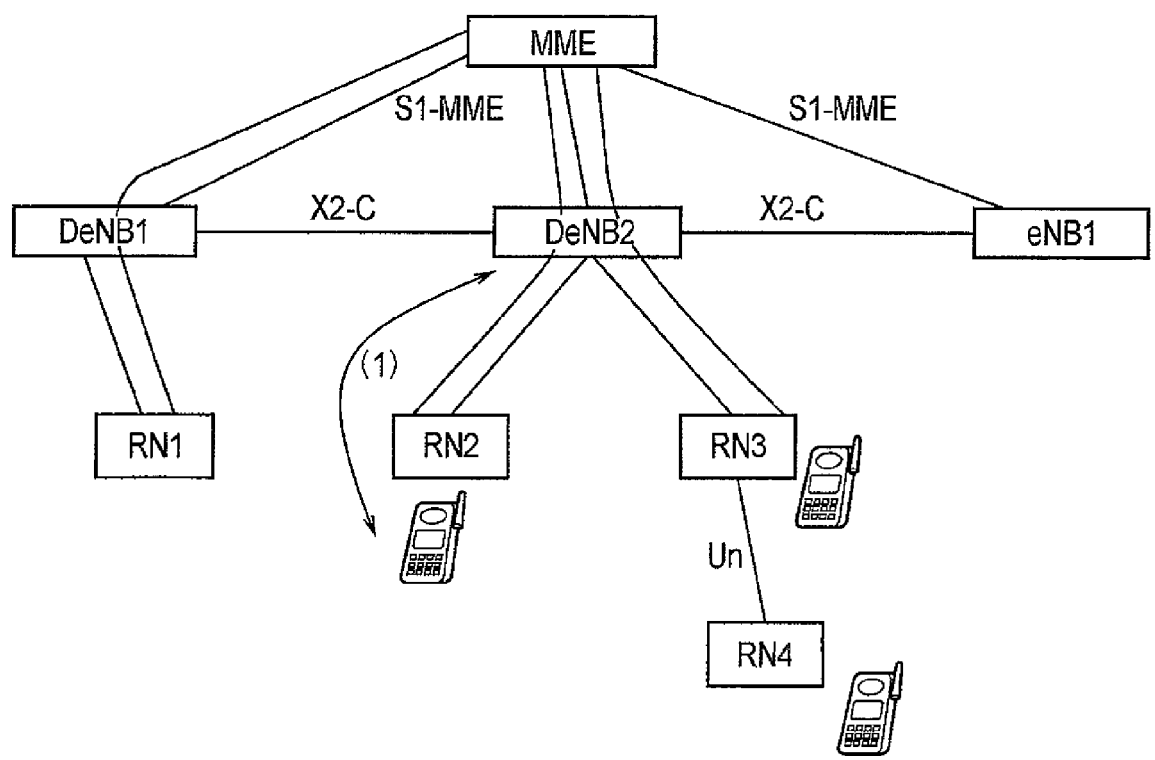
FIG. 1 is a diagram showing the entire configuration of the mobile communication system according to one or more embodiments of the present invention.

The mobile communication system according to the present invention is an LTE-Advanced mobile communication system including, for example, as illustrated in FIG. 1, a mobile switching center MME, relay nodes RN1 to RN4, a radio base station DeNB (Donor eNB) 1 that is connected to the relay node RN1, a radio base station DeNB2 that is connected to the relay nodes RN2 and RN3, and a radio base station eNB1.

Herein, the radio base station DeNB1 and the radio base station DeNB2 are connected via an X2-C interface, and the radio base station DeNB2 and the radio base station eNB1 are connected via an X2-C interface.

Also, the radio base station DeNB1, the radio base station DeNB2, and the radio base station eNB1 are respectively connected with the mobile switching center MME via S1-MME interfaces.

In such a mobile communication system, the mobile station UE is configured to set a radio bearer between the radio base stations eNB (DeNB) and the relay nodes RN in order to perform radio communication.

Also, in such a mobile communication system, as illustrated by (1) of FIG. 1, the mobile station UE is configured to conduct a handover process between the state in which a radio bearer is set with the relay node RN2 in order to communicate via the relay node RN2 and the radio base station DeNB2, and the state in which a radio bearer is set with the radio base station DeNB2 in order to communicate via the radio base station DeNB2.

Such a handover process is also configured such that the control signals (X2AP signals) involved in the handover process are sent and received via an X2-C radio bearer (radio bearer) between the relay node RN2 and the radio base station DeNB2.

Figure 2:
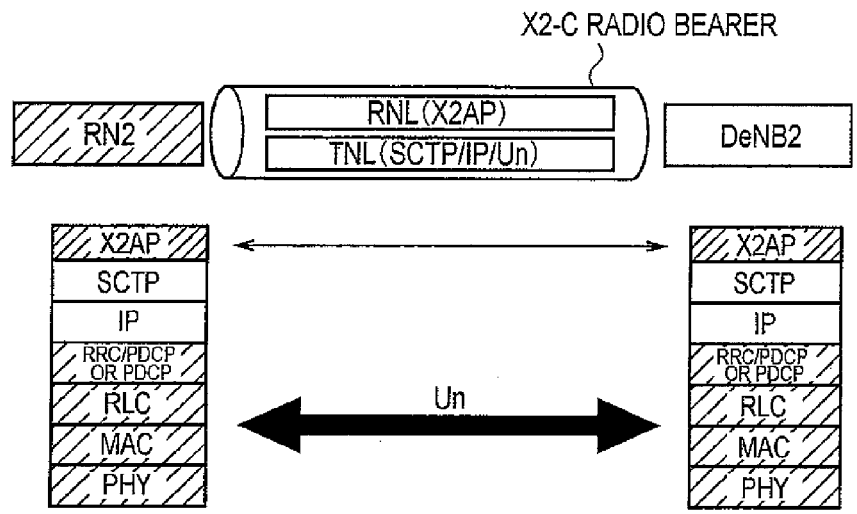
FIG. 2 is a diagram showing the protocol stack of the mobile communication system according to one or more embodiments of the present invention.
Figure 3:
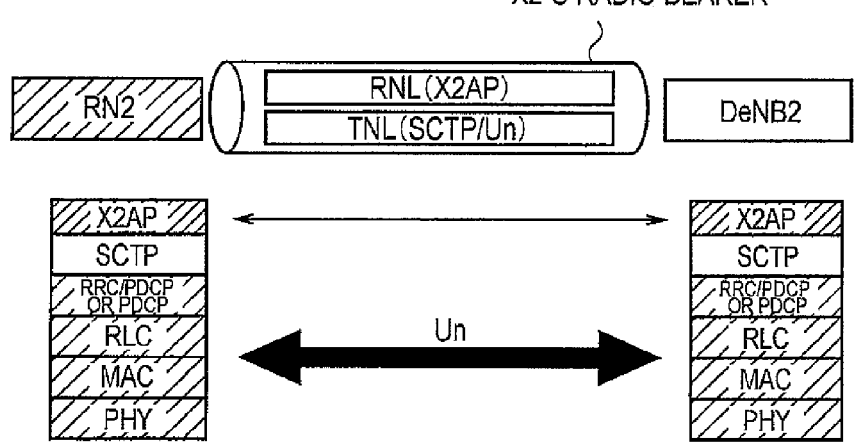
FIG. 3 is a diagram showing the protocol stack of the mobile communication system according to one or more embodiments of the present invention.
Figure 4:
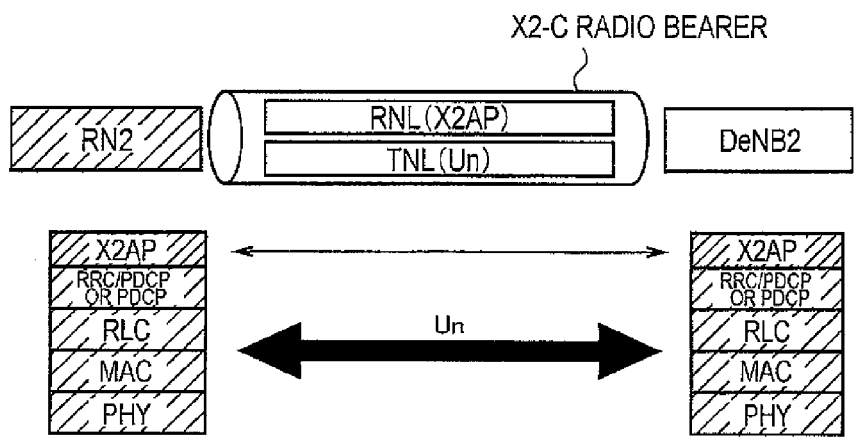
FIG. 4 is a diagram showing the protocol stack of the mobile communication system according to one or more embodiments of the present invention.

For example, as illustrated in FIG. 2 to FIG. 4, as X2-C radio bearer functions configured to set the X2-C radio bearer, the relay node RN2 and the radio base station DeNB2 include a physical (PHY) layer function, an MAC(Media Access Control) layer function provided as an upper layer function of the physical (PHY) layer function, an RLC (Radio Link Control) layer function provided as an upper layer function of the MAC layer function, and a PDCP (Packet Data Convergence Protocol) layer function provided as an upper layer function of the RLC layer function.

Note that the relay node RN2 and the radio base station DeNB2 may include an RRC (Radio Resource Control) layer function set as an upper layer function of the PDCP layer function.

Also, as illustrated in FIG. 2, as an upper layer function of the X2-C radio bearer functions, the relay node RN2 and the radio base station DeNB2 may include an IP layer function (the first layer function) configured to perform security processes between the relay node RN2 and the radio base station DeNB2, and may include an SCTP layer function (the second layer function) configured to perform keep-alive processes for the X2-C radio bearer as an upper layer function of the IP layer function.

Alternatively, as illustrated in FIG. 3, the relay node RN2 and the radio base station DeNB2 may include an SCTP layer function configured to perform keep-alive processes for the X2-C radio bearer, as an upper layer function of the X2-C radio bearer function. In the example in FIG. 3, the relay node RN2 and the radio base station DeNB2 do not include an IP layer function configured to perform security processes between the relay node RN2 and the radio base station DeNB2.

Furthermore, as illustrated in FIG. 4, the relay node RN2 and the radio base station DeNB2 need not include the SCTP layer function configured to perform keep-alive processes for the X2-C radio bearer and with the IP layer function configured to perform security processes between the relay node RN2 and the radio base station DeNB2 as upper layer functions of the X2-C radio bearer function.

A description is given below with reference to FIG. 5 for the operation in the mobile communication system according to this embodiment where the mobile station UE hands over from the state in which a radio bearer has been set with the relay node RN2 in order to communicate via the relay node RN2 and the radio base station DeNB2, to the state in which a radio bearer has been set with the radio base station DeNB2 in order to communicate via the radio base station DeNB2.

Figure 5:
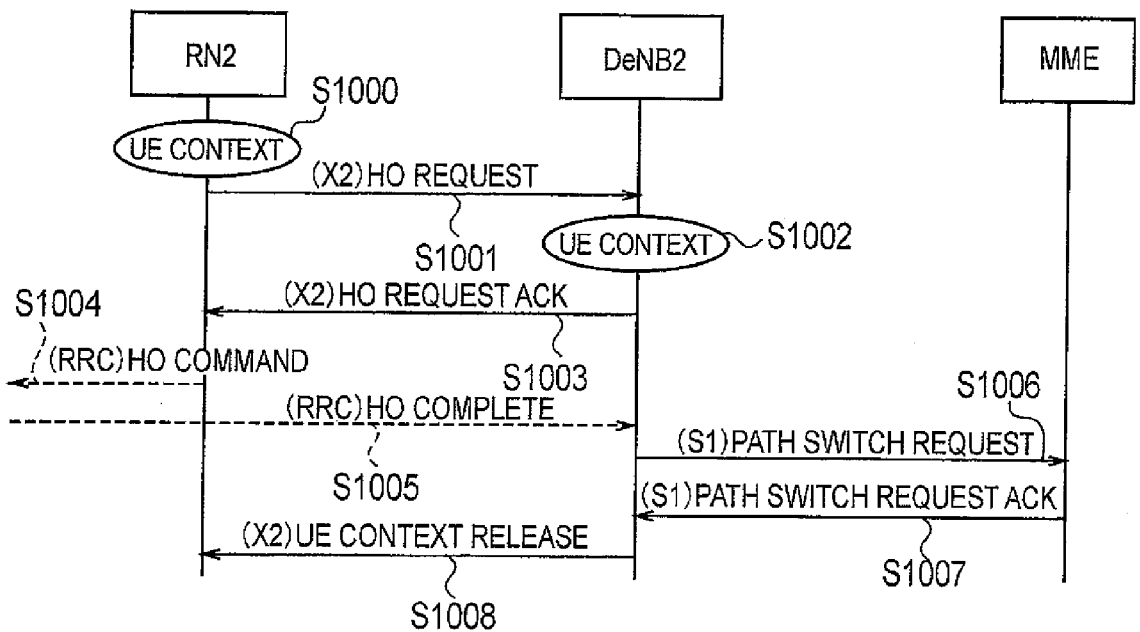
FIG. 5 is a sequence diagram showing the operation of the mobile communication system according to one or more embodiments of the present invention.
Figure 6:
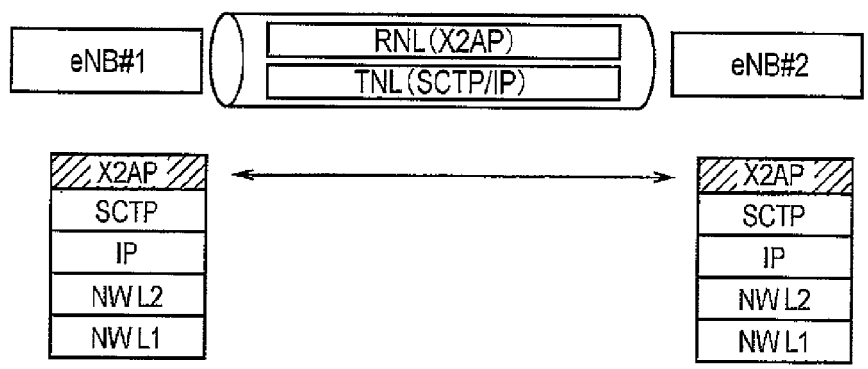
FIG. 6 is a diagram showing the protocol stack of a current mobile communication system.

As illustrated in FIG. 5, the relay node RN2 manages the "UE Context" of the mobile station UE in step S1000, and sends an "HO Request (handover request signal)" to the radio base station DeNB2 via the X2-C radio bearer in step S1001 to request a handover by the mobile station UE from the relay node RN2 to the radio base station DeNB2.

The radio base station DeNB2, upon receiving the "HO Request", stores the "UE Context" of the mobile station UE in step S1002, and sends an "HO Request Ack (handover request acknowledgement signal)" to the relay node RN2 via the X2-C radio bearer in step S1003.

In step S1004, the relay node RN2 sends an "HO Command (handover instruction signal)" to the mobile station UE by means of the RRC layer function, in order to instruct a handover to the radio base station DeNB2.

In step S1005, the mobile station UE sends an "HO Complete (handover completion signal)" to the radio base station DeNB2 by means of the RRC layer function.

In step S1006, the radio base station DeNB2 sends a "Path Switch Request (path switch request signal)" to the mobile switching center MME via the S1-MME interface.

In step S1007, the mobile switching center MME sends a "Path Switch Request Ack (path switch request acknowledgement signal)" to the radio base station DeNB2 via the S1-MME interface, and also switches the signal transfer destination addressed to the mobile base station UE from the relay node RN2 to the radio base station DeNB2.

In step S1008, the radio base station DeNB2 sends a "UE Context Release" to the relay node RN2 via the X2-C radio bearer, and the relay node RN2 terminates management of the "UE Context" of the mobile station UE in reaction to the "UE Context Release".

In addition, in FIG. 5, the relay node RN2 and the radio base station DeNB2 may be interchanged.

According to the mobile communication system of this embodiment, it is possible to implement a handover process involving the relay nodes RN without performing a major renovation of the protocol stack of each device used in the LTE mobile communication system.

Further, according to the mobile communication system of this embodiment, there is no need to set an X2-C radio bearer between the radio base station DeNB2 and the relay node RN2 during the handover process by the mobile station UE, and therefore the handover process can be performed quickly.

Note that operation of the above described the mobile station UE, the relay node RN, the radio base station eNB and the mobile switching center MME may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the relay node RN, the radio base station eNB and the mobile switching center MME. Also, the storage medium and the processor may be provided in the mobile station UE, the relay node RN, the radio base station eNB and the mobile switching center MME as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication system in which a relay node and a radio base station are connected via a radio bearer, wherein
the relay node comprises a processor for performing a radio bearer function of setting the radio bearer between the relay node and the radio base station, comprises: a physical layer; an MAC layer provided as an upper layer of the physical layer; an RLC layer provided as an upper layer of the MAC layer; and a PDCP layer provided as an upper layer of the RLC layer, the relay node comprises: an IP layer as an upper layer of the radio bearer; an SCTP layer provided as an upper layer of the IP layer; and an X2AP layer provided as an upper layer of the SCTP layer, the radio base station comprises a processor for performing a radio bearer function of setting the radio bearer between the radio base station and the relay node, comprises: a physical layer; an MAC layer provided as an upper layer of the physical layer; an RLC layer provided as an upper layer of the MAC layer; and a PDCP layer provided as an upper layer of the RLC layer, the radio base station comprises: an IP layer as an upper layer of the radio bearer; an SCTP layer provided as an upper layer of the IP layer; and an X2AP layer provided as an upper layer of the SCTP layer, and a control signal relating to a handover process is configured to terminate between the X2AP layer of the relay node and the X2AP layer of the radio base station, wherein the handover process is between the status of the mobile station communicating with the radio base station via the relay node and the status of the mobile station communicating with the radio base station.

* * * * *